(12) United States Patent
Jordan et al.

(10) Patent No.: US 7,718,057 B2
(45) Date of Patent: May 18, 2010

(54) WASTEWATER TREATMENT SYSTEM

(75) Inventors: Edward J. Jordan, Lenexa, KS (US); Wenjun Liu, King of Prussia, PA (US)

(73) Assignee: Siemens Water Technologies Corp., Lowell, MA (US)

( * ) Notice: Subject to any disclaimer, the term of this patent is extended or adjusted under 35 U.S.C. 154(b) by 0 days.

(21) Appl. No.: 12/233,195

(22) Filed: Sep. 18, 2008

(65) Prior Publication Data
US 2009/0026120 A1    Jan. 29, 2009

Related U.S. Application Data

(63) Continuation of application No. 11/542,752, filed on Oct. 4, 2006, now abandoned.

(60) Provisional application No. 60/723,744, filed on Oct. 5, 2005.

(51) Int. Cl.
*C02F 3/00* (2006.01)

(52) U.S. Cl. .................. 210/196; 210/532.1; 210/532.2; 210/906; 210/150; 210/151; 210/220

(58) Field of Classification Search .................. 210/196, 210/532.1–532.2, 906, 150–151, 220
See application file for complete search history.

(56) References Cited

U.S. PATENT DOCUMENTS

| 256,008 A | 4/1882 | Leak |
|---|---|---|
| 285,321 A | 9/1883 | Tams |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,183,191 A | 5/1965 | Hach |
| 3,198,636 A | 8/1965 | Bouthilet |
| 3,228,876 A | 1/1966 | Mahon |
| 3,442,002 A | 5/1969 | Geary et al. |
| 3,462,362 A | 8/1969 | Kollsman |
| 3,492,698 A | 2/1970 | Geary et al. |
| 3,556,305 A | 1/1971 | Shorr |
| 3,591,010 A | 7/1971 | Pall |
| 3,625,827 A | 12/1971 | Wildi et al. |
| 3,654,147 A | 4/1972 | Levin et al. |
| 3,693,406 A | 9/1972 | Tobin, III |
| 3,700,561 A | 10/1972 | Ziffer |
| 3,708,071 A | 1/1973 | Crowley |
| 3,728,256 A | 4/1973 | Cooper, IV |

(Continued)

FOREIGN PATENT DOCUMENTS

AU       34400/84       9/1983

(Continued)

OTHER PUBLICATIONS

Almulla et al., Desalination, 153 (2002), pp. 237-243.

(Continued)

*Primary Examiner*—Chester T Barry

(57) ABSTRACT

This invention is directed to a wastewater treatment system having a fluidizable media carrying anoxic bacteria in a first treatment zone and a filter membrane positioned in a second treatment zone. A wastewater is contacted with the fluidizable media and further contacted with air and a filter membrane.

16 Claims, 1 Drawing Sheet

U.S. PATENT DOCUMENTS

| | | |
|---|---|---|
| 3,763,055 A | 10/1973 | White et al. |
| 3,791,631 A | 2/1974 | Meyer |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,731 A | 8/1978 | Yamazaki |
| 4,107,043 A | 8/1978 | McKinney |
| 4,138,460 A | 2/1979 | Tigner |
| 4,183,890 A | 1/1980 | Bollinger |
| 4,188,817 A | 2/1980 | Steigelmann |
| 4,190,411 A | 2/1980 | Fujimoto |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,407,975 A | 10/1983 | Yamaguchi |
| 4,412,003 A | 10/1983 | Evans |
| 4,414,113 A | 11/1983 | LaTerra |
| 4,414,172 A | 11/1983 | Leason |
| 4,431,545 A | 2/1984 | Pall et al. |
| 4,451,369 A | 5/1984 | Sekino et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schleuter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,913,819 A | 4/1990 | Patterson |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,963,304 A | 10/1990 | Im et al. |
| 4,968,430 A | 11/1990 | Hildenbrand et al. |
| 4,968,733 A | 11/1990 | Muller et al. |
| 4,969,997 A | 11/1990 | Klüver et al. |
| 4,988,444 A | 1/1991 | Applegate et al. |
| 4,999,038 A | 3/1991 | Lundberg |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Müller et al. |
| 5,066,402 A | 11/1991 | Anselme et al. |
| 5,069,065 A | 12/1991 | Sprunt et al. |
| 5,075,065 A | 12/1991 | Effenberger et al. |
| 5,076,925 A | 12/1991 | Roesink et al. |
| 5,079,272 A | 1/1992 | Allegrezza et al. |
| 5,094,750 A | 3/1992 | Kopp et al. |
| 5,094,867 A | 3/1992 | Detering et al. |
| 5,098,567 A | 3/1992 | Nishiguchi |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,169,528 A | 12/1992 | Karbachasch et al. |

| | | | | | | |
|---|---|---|---|---|---|---|
| 5,182,019 A | 1/1993 | Cote et al. | | 5,906,742 A | 5/1999 | Wang et al. |
| 5,192,442 A | 3/1993 | Piccirillo et al. | | 5,910,250 A | 6/1999 | Mahendran et al. |
| 5,192,456 A | 3/1993 | Ishida et al. | | 5,914,039 A | 6/1999 | Mahendran et al. |
| 5,192,478 A | 3/1993 | Caskey | | 5,918,264 A | 6/1999 | Drummond et al. |
| 5,194,149 A | 3/1993 | Selbie et al. | | 5,942,113 A | 8/1999 | Morimura |
| 5,198,116 A | 3/1993 | Comstock et al. | | 5,944,997 A | 8/1999 | Pedersen et al. |
| 5,198,162 A | 3/1993 | Park et al. | | 5,951,878 A | 9/1999 | Astrom |
| 5,209,852 A | 5/1993 | Sunaoka et al. | | 5,958,243 A | 9/1999 | Lawrence et al. |
| 5,211,823 A | 5/1993 | Giuffrida et al. | | 5,961,830 A | 10/1999 | Barnett |
| 5,221,478 A | 6/1993 | Dhingra et al. | | 5,968,357 A | 10/1999 | Doelle et al. |
| 5,227,063 A | 7/1993 | Langerak et al. | | 5,988,400 A | 11/1999 | Karachevtcev et al. |
| 5,248,424 A | 9/1993 | Cote et al. | | 5,997,745 A | 12/1999 | Tonelli et al. |
| 5,262,054 A | 11/1993 | Wheeler | | 6,017,451 A | 1/2000 | Kopf |
| 5,271,830 A | 12/1993 | Faivre et al. | | 6,024,872 A | 2/2000 | Mahendran |
| 5,275,766 A | 1/1994 | Gadkaree et al. | | 6,036,030 A | 3/2000 | Stone et al. |
| 5,286,324 A | 2/1994 | Kawai et al. | | 6,039,872 A | 3/2000 | Wu et al. |
| 5,290,457 A | 3/1994 | Karbachasch et al. | | 6,042,677 A | 3/2000 | Mahendran et al. |
| 5,297,420 A | 3/1994 | Gilliland et al. | | 6,045,698 A | 4/2000 | Côté et al. |
| 5,316,671 A | 5/1994 | Murphy | | 6,045,899 A | 4/2000 | Wang et al. |
| 5,320,760 A | 6/1994 | Freund et al. | | 6,048,454 A | 4/2000 | Jenkins |
| 5,353,630 A | 10/1994 | Soda et al. | | 6,048,455 A | 4/2000 | Janik |
| 5,358,732 A | 10/1994 | Seifter et al. | | 6,066,401 A | 5/2000 | Stilburn |
| 5,361,625 A | 11/1994 | Ylvisaker | | 6,074,718 A | 6/2000 | Puglia et al. |
| 5,364,527 A | 11/1994 | Zimmerman et al. | | 6,077,435 A | 6/2000 | Beck et al. |
| 5,364,529 A | 11/1994 | Morin et al. | | 6,083,393 A | 7/2000 | Wu et al. |
| 5,374,353 A | 12/1994 | Murphy | | 6,096,213 A | 8/2000 | Radovanovic et al. |
| 5,389,260 A | 2/1995 | Hemp et al. | | 6,113,782 A | 9/2000 | Leonard |
| 5,393,433 A | 2/1995 | Espenan et al. | | 6,120,688 A | 9/2000 | Daly et al. |
| 5,396,019 A | 3/1995 | Sartori et al. | | 6,126,819 A | 10/2000 | Heine et al. |
| 5,401,401 A | 3/1995 | Hickok et al. | | 6,146,747 A | 11/2000 | Wang et al. |
| 5,401,405 A | 3/1995 | Loker | | 6,149,817 A | 11/2000 | Peterson et al. |
| 5,403,479 A | 4/1995 | Smith et al. | | 6,156,200 A | 12/2000 | Zha et al. |
| 5,405,528 A | 4/1995 | Selbie et al. | | 6,159,373 A | 12/2000 | Beck et al. |
| 5,411,663 A | 5/1995 | Johnson | | 6,193,890 B1 | 2/2001 | Pedersen et al. |
| 5,417,101 A | 5/1995 | Weich | | 6,202,475 B1 | 3/2001 | Selbie et al. |
| 5,419,816 A | 5/1995 | Sampson et al. | | 6,214,231 B1 | 4/2001 | Cote et al. |
| 5,451,317 A | 9/1995 | Ishida et al. | | 6,214,232 B1 | 4/2001 | Baurmeister et al. |
| 5,458,779 A | 10/1995 | Odegaard | | 6,221,247 B1 | 4/2001 | Nemser et al. |
| 5,468,397 A | 11/1995 | Barboza et al. | | 6,245,239 B1 | 6/2001 | Cote et al. |
| 5,470,469 A | 11/1995 | Eckman | | 6,254,773 B1 | 7/2001 | Biltoft |
| 5,477,731 A | 12/1995 | Mouton | | 6,264,839 B1 | 7/2001 | Mohr et al. |
| 5,479,590 A | 12/1995 | Lin | | 6,277,512 B1 | 8/2001 | Hamrock et al. |
| 5,480,553 A | 1/1996 | Yamamori et al. | | 6,280,626 B1 | 8/2001 | Miyashita et al. |
| 5,484,528 A | 1/1996 | Yagi et al. | | 6,284,135 B1 | 9/2001 | Ookata |
| 5,490,939 A | 2/1996 | Gerigk et al. | | 6,290,756 B1 | 9/2001 | Macheras et al. |
| 5,491,023 A | 2/1996 | Tsai et al. | | 6,294,039 B1 | 9/2001 | Mahendran et al. |
| 5,501,798 A | 3/1996 | Al-Samadi et al. | | 6,299,773 B1 | 10/2001 | Takamura et al. |
| 5,525,220 A | 6/1996 | Yagi et al. | | 6,303,026 B1 | 10/2001 | Lindbo |
| 5,531,848 A | 7/1996 | Brinda et al. | | 6,303,035 B1 | 10/2001 | Cote et al. |
| 5,531,900 A | 7/1996 | Raghavan et al. | | 6,315,895 B1 | 11/2001 | Summerton et al. |
| 5,543,002 A | 8/1996 | Brinda et al. | | 6,322,703 B1 | 11/2001 | Taniguchi et al. |
| 5,552,047 A | 9/1996 | Oshida et al. | | 6,325,928 B1 | 12/2001 | Pedersen et al. |
| 5,554,283 A | 9/1996 | Brinda et al. | | 6,337,018 B1 | 1/2002 | Mickols |
| 5,556,591 A | 9/1996 | Jallerat et al. | | RE37,549 E | 2/2002 | Mahendran et al. |
| 5,575,963 A | 11/1996 | Soffer et al. | | 6,354,444 B1 | 3/2002 | Mahendran |
| 5,597,732 A | 1/1997 | Bryan-Brown | | 6,361,695 B1 | 3/2002 | Husain et al. |
| 5,607,593 A | 3/1997 | Cote et al. | | 6,368,819 B1 | 4/2002 | Gaddy et al. |
| 5,639,373 A | 6/1997 | Mahendran et al. | | 6,372,138 B1 | 4/2002 | Cho et al. |
| 5,643,455 A | 7/1997 | Kopp et al. | | 6,375,848 B1 | 4/2002 | Cote et al. |
| 5,647,988 A | 7/1997 | Kawanishi et al. | | 6,387,189 B1 | 5/2002 | Gröschl et al. |
| 5,670,053 A | 9/1997 | Collentro et al. | | 6,402,955 B2 | 6/2002 | Ookata |
| 5,677,360 A | 10/1997 | Yamamori et al. | | 6,406,629 B1 | 6/2002 | Husain et al. |
| 5,688,460 A | 11/1997 | Ruschke | | 6,423,214 B1 | 7/2002 | Lindbo |
| 5,733,456 A | 3/1998 | Okey et al. | | 6,423,784 B1 | 7/2002 | Hamrock et al. |
| 5,744,037 A | 4/1998 | Fujimura et al. | | 6,432,310 B1 | 8/2002 | Andou et al. |
| 5,747,605 A | 5/1998 | Breant et al. | | 6,440,303 B2 | 8/2002 | Spriegel |
| 5,766,479 A | 6/1998 | Collentro et al. | | D462,699 S | 9/2002 | Johnson et al. |
| 5,783,083 A | 7/1998 | Henshaw et al. | | 6,444,124 B1 | 9/2002 | Onyeche et al. |
| 5,843,069 A | 12/1998 | Butler et al. | | 6,468,430 B1 | 10/2002 | Kimura et al. |
| 5,846,424 A | 12/1998 | Khudenko | | 6,485,645 B1 | 11/2002 | Husain et al. |
| 5,888,401 A | 3/1999 | Nguyen | | 6,495,041 B2 | 12/2002 | Taniguchi et al. |
| 5,895,570 A | 4/1999 | Liang | | 6,524,481 B2 | 2/2003 | Zha et al. |
| 5,906,739 A | 5/1999 | Osterland et al. | | 6,524,733 B1 | 2/2003 | Nonobe |

| | | |
|---|---|---|
| 6,550,747 B2 | 4/2003 | Rabie et al. |
| 6,555,005 B1 | 4/2003 | Zha et al. |
| 6,576,136 B1 | 6/2003 | De Moel et al. |
| D478,913 S | 8/2003 | Johnson et al. |
| 6,620,319 B2 | 9/2003 | Behmann et al. |
| 6,627,082 B2 | 9/2003 | Del Vecchio |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,189 B2 | 3/2004 | Rabie et al. |
| 6,708,957 B2 | 3/2004 | Cote et al. |
| 6,721,529 B2 | 4/2004 | Chen et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,758,972 B2 | 7/2004 | Vriens et al. |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,912 B2 | 9/2004 | Blong |
| 6,805,806 B2 | 10/2004 | Arnaud |
| 6,811,696 B2 | 11/2004 | Wang et al. |
| 6,814,861 B2 | 11/2004 | Husain et al. |
| 6,821,420 B2 | 11/2004 | Zha et al. |
| 6,841,070 B2 | 1/2005 | Zha et al. |
| 6,861,466 B2 | 3/2005 | Dadalas et al. |
| 6,863,817 B2 | 3/2005 | Liu et al. |
| 6,863,818 B2 | 3/2005 | Daigger et al. |
| 6,863,823 B2 | 3/2005 | Côté |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,701 B2 | 2/2007 | Gaid et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,300,022 B2 | 11/2007 | Muller |
| 7,387,723 B2 | 6/2008 | Jordan |
| 7,455,765 B2 | 11/2008 | Elefritz et al. |
| 7,476,322 B2 | 1/2009 | Dimitriou et al. |
| 2002/0070157 A1 | 6/2002 | Yamada |
| 2002/0148767 A1 | 10/2002 | Johnson et al. |
| 2003/0038080 A1 | 2/2003 | Vriens et al. |
| 2003/0057155 A1 | 3/2003 | Husain et al. |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0178365 A1 | 9/2003 | Zha et al. |
| 2003/0226797 A1 | 12/2003 | Phelps |
| 2004/0007525 A1 | 1/2004 | Rabie et al. |
| 2004/0035770 A1 | 2/2004 | Edwards et al. |
| 2004/0084369 A1 | 5/2004 | Zha et al. |
| 2004/0145076 A1 | 7/2004 | Zha et al. |
| 2004/0168979 A1 | 9/2004 | Zha et al. |
| 2004/0178154 A1 | 9/2004 | Zha et al. |
| 2004/0217053 A1 | 11/2004 | Zha et al. |
| 2004/0232076 A1 | 11/2004 | Zha et al. |
| 2005/0029174 A1 | 2/2005 | Collins |
| 2005/0029185 A1 | 2/2005 | Muller |
| 2005/0029186 A1 | 2/2005 | Muller |
| 2005/0032982 A1 | 2/2005 | Muller et al. |
| 2005/0103722 A1 | 5/2005 | Freydina et al. |
| 2005/0115880 A1 | 6/2005 | Pollock |
| 2005/0115899 A1 | 6/2005 | Liu et al. |
| 2005/0139538 A1 | 6/2005 | Lazaredes |
| 2005/0194310 A1 | 6/2005 | Liu et al. |
| 2005/0194315 A1 | 9/2005 | Adams et al. |
| 2006/0000775 A1 | 1/2006 | Zha et al. |
| 2006/0131234 A1 | 6/2006 | Zha et al. |
| 2006/0201876 A1 | 9/2006 | Jordan |
| 2006/0261007 A1 | 11/2006 | Zha et al. |
| 2006/0273038 A1 | 12/2006 | Syed et al. |
| 2007/0007214 A1 | 1/2007 | Zha et al. |
| 2007/0056905 A1 | 3/2007 | Beck et al. |
| 2007/0075021 A1 | 4/2007 | Johnson |
| 2007/0108125 A1 | 5/2007 | Cho et al. |
| 2007/0227973 A1 | 10/2007 | Zha et al. |

FOREIGN PATENT DOCUMENTS

| | | |
|---|---|---|
| AU | 55847/86 | 3/1985 |
| AU | 77066/87 | 7/1986 |
| CN | 1050770 C | 1/1995 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 29804927 U1 | 6/1998 |
| DE | 29906389 | 6/1999 |
| EP | 012557 B1 | 2/1983 |
| EP | 126714 A2 | 11/1984 |
| EP | 050447 B1 | 10/1985 |
| EP | 250337 A1 | 12/1987 |
| EP | 327025 A1 | 8/1989 |
| EP | 090383 B1 | 5/1990 |
| EP | 407900 A2 | 1/1991 |
| EP | 463627 A2 | 1/1992 |
| EP | 492942 A2 | 7/1992 |
| EP | 518250 B1 | 12/1992 |
| EP | 547575 A1 | 6/1993 |
| EP | 395133 B1 | 2/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 1034835 A1 | 9/2000 |
| EP | 1052012 A1 | 11/2000 |
| EP | 1349644 | 10/2003 |
| EP | 1350555 A1 | 10/2003 |
| EP | 1236503 B1 | 8/2004 |
| FR | 2620712 | 3/1989 |
| FR | 2674448 | 10/1992 |
| FR | 2699424 | 6/1994 |
| GB | 702911 | 1/1954 |
| GB | 2253572 A | 9/1992 |
| JP | 54-162684 | 12/1979 |
| JP | 55-129155 | 6/1980 |
| JP | 55-099703 | 7/1980 |
| JP | 55-129107 | 10/1980 |
| JP | 56-021604 | 2/1981 |
| JP | 56-118701 | 9/1981 |

| | | | | | | |
|---|---|---|---|---|---|---|
| JP | 56-121685 | 9/1981 | | JP | 07-289860 | 11/1995 |
| JP | 58-088007 | 5/1983 | | JP | 07-303895 | 11/1995 |
| JP | 60-019002 | 1/1985 | | JP | 08-010585 | 1/1996 |
| JP | 60-206412 | 10/1985 | | JP | 09-099227 | 4/1997 |
| JP | 61-097005 | 5/1986 | | JP | 09-141063 | 6/1997 |
| JP | 61-097006 | 5/1986 | | JP | 09-187628 | 7/1997 |
| JP | 61-107905 | 5/1986 | | JP | 09-220569 | 8/1997 |
| JP | 61-167406 | 7/1986 | | JP | 09-271641 | 10/1997 |
| JP | 61-167407 | 7/1986 | | JP | 09-324067 | 12/1997 |
| JP | 61-171504 | 8/1986 | | JP | 10-033955 | 2/1998 |
| JP | 61-192309 | 8/1986 | | JP | 10-048466 | 2/1998 |
| JP | 61-222510 | 10/1986 | | JP | 10-085565 | 4/1998 |
| JP | 61-242607 | 10/1986 | | JP | 10-156149 | 6/1998 |
| JP | 61-249505 | 11/1986 | | JP | 11-028467 | 2/1999 |
| JP | 61-257203 | 11/1986 | | JP | 11-156166 | 6/1999 |
| JP | 61-263605 | 11/1986 | | JP | 11-165200 | 6/1999 |
| JP | 61-291007 | 12/1986 | | JP | 11-333265 | 7/1999 |
| JP | 61-293504 | 12/1986 | | JP | 11-033365 | 9/1999 |
| JP | 62-004408 | 1/1987 | | JP | 11-319507 | 11/1999 |
| JP | 62-114609 | 5/1987 | | JP | 2000-070684 | 3/2000 |
| JP | 62-140607 | 6/1987 | | JP | 2000-185220 | 4/2000 |
| JP | 62-144708 | 6/1987 | | JP | 2000-157850 | 6/2000 |
| JP | 62-163708 | 7/1987 | | JP | 2000-317276 | 11/2000 |
| JP | 62-179540 | 8/1987 | | JP | 2001-009246 | 1/2001 |
| JP | 62-250908 | 10/1987 | | JP | 2001-070967 | 3/2001 |
| JP | 63-097634 | 4/1988 | | JP | 2001-079367 | 3/2001 |
| JP | 63-143905 | 6/1988 | | JP | 2001-104760 | 4/2001 |
| JP | 63-171607 | 7/1988 | | JP | 2001-190937 | 7/2001 |
| JP | 63-180254 | 7/1988 | | JP | 2001-190938 | 7/2001 |
| JP | S63-38884 | 10/1988 | | JP | 2001-205055 | 7/2001 |
| JP | 01-151906 | 6/1989 | | JP | 2000-342932 | 12/2002 |
| JP | 01-307409 | 12/1989 | | JP | 2003-047830 | 2/2003 |
| JP | 02-026625 | 1/1990 | | JP | 2003-062436 | 3/2003 |
| JP | 02-031200 | 2/1990 | | JP | 2003-135935 | 5/2003 |
| JP | 02-107318 | 4/1990 | | KR | 2002-0090967 | 12/2002 |
| JP | 02-126922 | 5/1990 | | NL | 1020491 C | 10/2003 |
| JP | 02-144132 | 6/1990 | | NL | 1021197 C | 10/2003 |
| JP | 02-164423 | 6/1990 | | TW | 347343 | 12/1998 |
| JP | 02-277528 | 11/1990 | | WO | WO 88-06200 | 8/1988 |
| JP | 02-284035 | 11/1990 | | WO | WO 89-00880 | 2/1989 |
| JP | 03-018373 | 1/1991 | | WO | WO 90-00434 | 1/1990 |
| JP | 03-028797 | 2/1991 | | WO | WO 91-04783 | 4/1991 |
| JP | 03-110445 | 5/1991 | | WO | WO 91-16124 | 10/1991 |
| JP | 04-187224 | 7/1992 | | WO | WO 93-02779 | 2/1993 |
| JP | 04-250898 | 9/1992 | | WO | WO 93-15827 | 8/1993 |
| JP | 04-256424 | 9/1992 | | WO | WO 93-23152 | 11/1993 |
| JP | 04-265128 | 9/1992 | | WO | WO 94-11094 | 5/1994 |
| JP | 04-293527 | 10/1992 | | WO | WO 95-34424 | 12/1995 |
| JP | 04-310223 | 11/1992 | | WO | WO 96-07470 A1 | 3/1996 |
| JP | 04-348252 | 12/1992 | | WO | WO 96-28236 | 9/1996 |
| JP | 05-023557 | 2/1993 | | WO | WO 96-41676 | 12/1996 |
| JP | 05-096136 | 4/1993 | | WO | WO 97-06880 | 2/1997 |
| JP | 05-137977 | 6/1993 | | WO | WO 98-22204 | 5/1998 |
| JP | 05-157654 | 6/1993 | | WO | WO 98-25694 | 6/1998 |
| JP | 05-285348 | 11/1993 | | WO | WO 98-28066 | 7/1998 |
| JP | 06-071120 | 3/1994 | | WO | WO 98-53902 | 12/1998 |
| JP | 06-114240 | 4/1994 | | WO | WO 99-01207 | 1/1999 |
| JP | 06-218237 | 8/1994 | | WO | WO 99-59707 | 11/1999 |
| JP | 06-277469 | 10/1994 | | WO | WO 00-18498 | 4/2000 |
| JP | 06-285496 | 10/1994 | | WO | WO 00-30742 | 6/2000 |
| JP | 06-343837 | 12/1994 | | WO | WO 01-00307 | 1/2001 |
| JP | 07-000770 | 1/1995 | | WO | WO 01-32299 | 5/2001 |
| JP | 07-024272 | 1/1995 | | WO | WO 01-36075 | 5/2001 |
| JP | 07-068139 | 3/1995 | | WO | WO 01-45829 A1 | 6/2001 |
| JP | 07-136470 | 5/1995 | | WO | WO 02-40140 A1 | 5/2002 |
| JP | 07-136471 | 5/1995 | | WO | WO 03-000389 A2 | 1/2003 |
| JP | 07-155758 | 6/1995 | | WO | WO 03-013706 A1 | 2/2003 |
| JP | 07-178323 | 7/1995 | | WO | WO 2004-101120 A1 | 11/2004 |
| JP | 07-185268 | 7/1995 | | WO | WO 2005-021140 A1 | 3/2005 |
| JP | 07-185271 | 7/1995 | | WO | WO 2005-037414 A1 | 4/2005 |
| JP | 07-236819 | 9/1995 | | WO | WO 2005-077499 A1 | 8/2005 |
| JP | 07-251043 | 10/1995 | | | | |
| JP | 07-275665 | 10/1995 | | | | |

WO    WO 2006-029456 A1    3/2006

OTHER PUBLICATIONS

Anonymous, "*Nonwoven Constructions of Dyneon™ THV and Dyneon™ The Fluorothermoplastics*", Research Disclosure Journal, Apr. 1999, RD 420013, 2 pages.

Cote et al., *Wat. Sci. Tech.* 38(4-5) (1998), pp. 437-442.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., $2^{nd}$ Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

ZENON, "Proposal for ZeeWeed® Membrane Filtration Equipment System for the City of Westminster, Colorado, Proposal No. 479-99," Mar. 2000, entire publication.

WASTEWATER TREATMENT SYSTEM

RELATED APPLICATIONS

This application is a continuation under 35 U.S.C. §120 of U.S. application Ser. No. 11/542,752, entitled "METHOD AND APPARATUS FOR TREATING WASTEWATER," filed on Oct. 4, 2006, which claims priority under 35 U.S.C. §119(e) to U.S. Provisional Application Ser. No. 60/723,744, entitled "METHOD AND APPARATUS FOR TREATING WASTEWATER," filed on Oct. 5, 2005, each of which is herein incorporated by reference in its entirety for all purposes.

BACKGROUND OF INVENTION

1. Field of Invention

The present invention relates to a system and method for treating wastewater, and more particularly to a wastewater treatment system and method utilizing a membrane bioreactor.

2. Discussion of Related Art

The importance of membrane for treatment of waste water is growing rapidly. With the arrival of submerged membrane processes where membrane modules are immersed in a large feed tank and filtrate is collected typically through suction applied to the filtrate side of the membrane, membrane bioreactors (MBRs) combining biological and physical processes in one stage promise to be more compact, efficient and economic. Membrane bioreactors are typically sized to accommodate community and large-scale sewage treatment, i.e. 160,000 gpd, and 20-40 mgd and more. These large-scale wastewater treatment systems are commonly designed to operate while attended, have numerous controls, and typically require chemical addition. A need remains for a simple, robust small scale wastewater treatment systems designed for relatively unattended use, requiring only periodic maintenance.

SUMMARY OF INVENTION

In accordance with one or more embodiments, the invention relates to a system and method of treating wastewater.

In one embodiment, a wastewater treatment system includes a first treatment zone fluidly connected to a second treatment zone. A fluidizable media carrying anoxic bacteria is positioned in the first treatment zone, and a membrane module comprising a filter membrane is positioned in the second treatment zone. The wastewater treatment system may also comprise an oxygen depleting zone.

Another embodiment is directed to a method of treating wastewater includes contacting a wastewater with an anoxic bacteria immobilized on a fluidized media to produce a first water product. The first water product is contacted with air to from a second water product which is passed through a filter membrane to produce a concentrated mixed liquor and a filtrate.

Another embodiment is directed to a method of treating a wastewater including passing a wastewater through a fluidized bed carrying anoxic bacteria to produce a first treated wastewater. A portion of the first treated wastewater is passed through a filter membrane to produce a concentrated mixed liquor and a filtrate, which is discharged.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
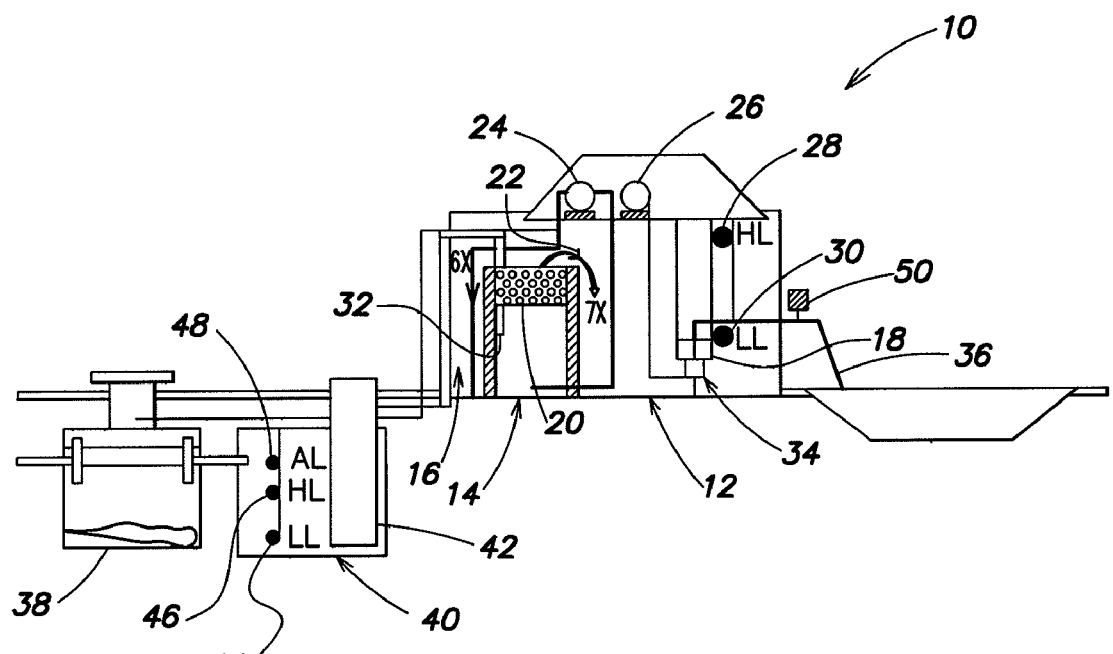
FIG. 1 illustrates a system in accordance with one or more embodiments of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

This invention is directed to wastewater treatment systems utilizing membrane bioreactors designed to treat wastewater flow of about 10,000 gpd or less. In one embodiment the wastewater treatment system is designed to treat wastewater flow of about 5,000 gpd. One or more embodiments are directed to a fluidized bed containing bacterial micro-organisms in conjunction with an MBR. Some aspects relative to one or more embodiments also include utilizing an oxygen depletion zone in conjunction with the MBR. "Wastewater," as used herein, defines a stream of waste from a residential or community source, having pollutants of biodegradable material, inorganic or organic compounds capable of being decomposed by bacteria, flowing into the wastewater treatment system. As used herein, a "wastewater treatment system" is a system, typically a biological treatment system, having a biomass population of bacterial micro-organisms of a diversity of types of bacteria, used to digest biodegradable material. Notably, the biomass requires an environment that provides the proper conditions for growth.

One embodiment of the present invention includes bioreactor having one or more treatment zones. As used herein, the phrase "treatment zone" is used to denote an individual treatment region. Individual treatment regions may be housed in a single vessel with one or more compartments. Alternatively, individual treatment regions may be housed in separate vessels, wherein a different treatment is carried out in separate vessels. The treatment zone, i.e. the vessel or compartment, may be sized and shaped according to a desired application and volume of wastewater to be treated.

The wastewater treatment system may comprise a fluidizable media housed in a first treatment zone. The fluidizable media may comprise biomass carriers designed to immobilize anoxic organisms. The biomass carriers may be formed of any material suitable to support organisms and to remain fluidized under operating conditions. In one embodiment, the fluidizable media has a specific gravity substantially the same as that of water. In another embodiment the fluidizable media has a surface area adequate to allow denitrifying bacteria to grow, which may enhance the efficiency of the anoxic reaction to remove nitrogen.

Any volume of fluidizable media may be utilized within the first treatment zone for a particular purpose. For example, a maximum volume of fluidized media may be used to substantially fill the first treatment zone, or a lesser volume of fluidized material may be used to fill a portion of the first treatment zone. Without being bound by any is particular theory, passing wastewater through denitrifying bacteria immobilized on the fluidizable media may increase the efficiency of the denitrification process.

The first treatment zone may also comprise means for maintaining the fluidized media within the first treatment zone during operation. For example, a baffle, weir, screen or perforated plate may be used to maintain the fluidizable media within the first treatment zone. Alternatively, the fluidizable media may be prevented from exiting the first treatment zone by establishing fluid counter currents during operation so that the fluidizable material remains appropriately suspended. In one embodiment, a screen or perforated plate is positioned across an entire cross sectional area of a vessel or compartment forming the first treatment zone to maintain the fluidizable media within the first treatment zone. The screen or perforated plate may also assist in providing a substantially uniform density of fluidizable media over the entire cross sectional area of the first treatment zone. One or more screens or perforated plates may be positioned within the first treatment zone to establish one or more fluidized bed regions. For example, one screen may be positioned at or near the top of the first treatment zone to contain a first fluidizable media region, and a second screen may be positioned below the first screen to contain a second fluidizable media region. The fluidizable media may, but need not be the same in the separate regions. Similarly, the fluidizable media may support the same or different anoxic organisms in the separate regions.

According to one embodiment of the invention, one or more porous or permeable membranes may be positioned in a second treatment zone. The membrane may have any configuration suitable for a particular purpose, such as sheet or hollow tube. The membrane may be formed of any material (natural or synthetic) suitable for a particular filtration process. In one embodiment, the membrane is formed of polymeric hollow fibers.

One or more membranes may be positioned in one or more membrane modules. The membrane modules may have any shape and cross sectional area suitable for use in a desired application, for example, square, rectangular, or cylindrical. In one embodiment, the membrane modules are rectangular.

According to one embodiment of the invention, one or more membrane modules may be positioned in a second treatment zone in such a way as to be completely submerged by fluid during operation. For example, the membrane module may be positioned vertically, horizontally, or at an angle within the second treatment zone. Multiple membrane modules may be positioned adjacent one another, or located at predetermined positions within the second treatment zone and may, but need not, be positioned in the same plane as others or parallel to one another. In one embodiment, hollow fiber membranes may be positioned horizontally within the second treatment zone. One or more membrane modules may be mounted directly to the vessel or compartment which forms the second treatment zone. Alternatively, one or more membrane modules may be mounted to a module support which may be removably attached to the vessel or compartment forming the second treatment zone. In one embodiment, a plurality of membrane modules are mounted to a module support rack to facilitate membrane maintenance and/or replacement. In another embodiment, membrane modules having vertical partitions may be positioned horizontally.

The second treatment zone may include an aeration system to suspend solids in wastewater or resultant concentrated mixed liquor contained within the second treatment zone, and/or to assist water transfer through the membrane. The aeration system may produce fine bubbles, coarse bubbles, a jet stream of gas, a jet of gas and fluid, and combinations thereof. The aeration system may be positioned in any suitable location within the second treatment zone. In one embodiment, aeration may be provided along a length of one or more membrane modules horizontally positioned.

The wastewater treatment system may comprise an oxygen depletion compartment fluidly connected to the first treatment zone and the second treatment zone. The oxygen depletion compartment may be sized to accept a portion of a wastestream exiting the first treatment zone, as well as a concentrated mixed liquor from the second treatment zone.

According to another embodiment, the wastewater treatment system may comprise one or more pretreatment units, such as to collect solids and/or to remove phosphorous. In one embodiment the pretreatment unit is a trap to remove floating solids, such as grease, and other gross organic solids until they become more soluble, and is positioned upstream of the first treatment zone. The trap may be sized to provide a volume of about 1×FF (1 forward feed or about 5,000 gpd). In another embodiment, the pretreatment unit is a chemical phosphorous removal unit.

According to another embodiment, the wastewater treatment system may comprise an equalization tank and/or a reserve storage tank fluidly connected to the bioreactor. The tank may be sized to accommodate fluctuations in wastewater generation to normalize flow into the bioreactor. For example, the equalization capacity may be equal to about 8 hours or about 33% of the FF. The same tank may also be sized to provide reserve capacity for an emergency such as a power failure, and may have a reserve capacity of about 16 hours or about 67% of the FF. In one embodiment, the tank is sized to provide a volume of about 1×FF (about 5,000 gpd) to provide for equalization and a reserve.

Referring to the figures, FIG. 1 illustrates one embodiment of the present wastewater treatment system. FIG. 1 shows a bioreactor 10 comprising an aerobic compartment 12, an anoxic compartment 14, and an oxygen depletion compartment 16. Two membrane modules 18 are positioned in the aerobic compartment 12. A high level sensor 28 in aerobic compartment 12 indicates that the wastewater in the aerobic compartment is approaching full volume, and may indicate that one or both of the membrane modules are not functioning properly. High level sensor 28 may turn off pump 42 in equalization/reserve tank 40 to interrupt wastewater flow into the bioreactor 10 and sound an alarm. Low level sensor 30 in the aerobic compartment 12 indicates that the level of wastewater in the aerobic compartment may fall below the plane of the membrane modules 18, and may subsequently expose the membranes to air causing them to dry. Low level sensor 30 may close valve 50 on line 36 to interrupt flow of filtrate leaving the bioreactor.

Figure 2:
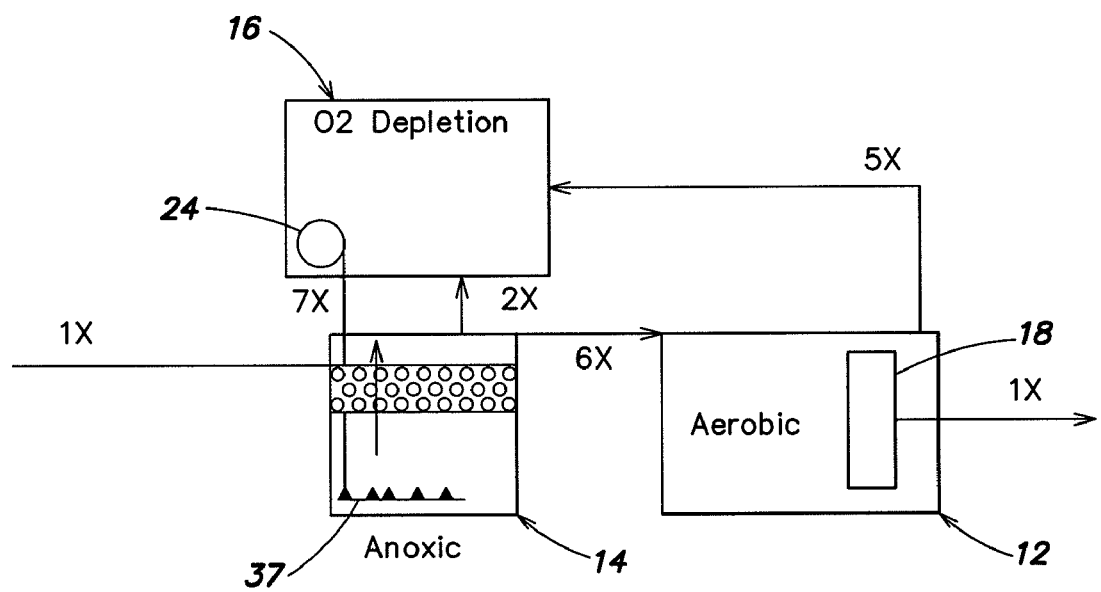
FIG. 2 is a flow chart illustrating a process in accordance with one or more embodiments of the invention.

Also as shown in FIG. 1, fluidized media 20 carrying an immobilized denitrifying bacteria is positioned in the anoxic compartment 14 and is prevented from entering the aerobic compartment 12 by screen 22. Wastewater to be treated enters the anoxic compartment 14 through inlet 32 and fluidizes the fluidizable media 20 under anoxic conditions. The wastewater passes up through the fluidized media 20 containing denitrifying organisms and produces a first treated wastewater. As shown in FIG. 2, a portion of the first treated wastewater passes to the aerobic compartment 12 at about 6×FF (about 30,000 gpd). A second portion of the first treated wastewater passes to an oxygen depletion compartment 16 at about 2×FF (about 10,000 gpd).

Blower 26 forces air through a fine bubble or a coarse bubble aeration system 34 in the aerobic compartment 12, providing an air scour for the membrane modules 18 and fluid circulation for the aerobic process. A portion of the first treated wastewater passes through the membranes under hydrostatic pressure at about 1×FF (5,000 gpd) to produce a filtrate and a concentrated mixed liquor. In FIG. 1, two B30R membrane modules available from US Filter are used. The membrane modules may be oriented vertically, horizontally, or at a predetermined angle. The modules may be assembled to a removable rack that can be lifted from the top of the aerobic compartment 12. A filtrate header (not shown) connects one end of the two membrane modules to line 36. The filtrate exits the first compartment 12 through line 36 for further treatment or release.

The concentrated mixed liquor passes to an oxygen depletion compartment 16 at about 5×FF (25,000 gpd). Dissolved oxygen is removed form the concentrated mixed liquor in the oxygen depletion compartment. The concentrated mixed liquor combines with a portion of the first treated wastewater in the oxygen depletion compartment 16 to produce a secondary wastewater. Pump 24 pumps the secondary wastewater at about 7×FF (35,000 gpd) to a distribution manifold at the bottom of the anoxic compartment 14 for further treatment. As shown in FIG. 2, discharge from pump 24 may include a manifold distribution system 37 to provide a more uniform distribution of upward flow of wastewater and secondary wastewater in the anoxic compartment, thereby ensuring the fluidized media remains fluidized. The manifold distribution system may be sized and shaped to provide adequate distribution of fluid flow. In one embodiment, the manifold distribution system comprises 1.5 inch pipes with multiple 0.25 inch holes to provide uniform distribution of the wastewater and secondary wastewater up through the fluidized media.

Also illustrated in FIG. 1 are trap 38 and equalization/reserve storage tank 40. Wastewater to be treated enters trap 38 at about 1×FF (5,000 gpd) where floating solids are trapped, and inert materials and gross organic solids settle. The wastewater then flows from trap 38 to tank 40 by gravity. Tank 40 has a volume of about 1×FF (5,000 gpd) to equalize flow and provide a reserve. Pump 42 moves the wastewater at about 1×FF (5,000 gpd) to the anoxic compartment 14. Pump 42 may be any pump suitable for the capacity of wastewater to be treated. In one embodiment, pump 42 may be a Zoller 5040 Filtered STEP System. Tank 40 includes 3 level sensors/alarms 44, 46, 48. Low level sensor 44 protects the pump from running dry, and high level sensor 46 activate a timer controlling an automatic valve 50 on line 36. Alarm level sensor 48 activates an alarm system to override the timer and open valve 50.

The flow chart of FIG. 2 illustrate one embodiment of forward feed, however, other forward feeds are contemplated. For example, forward feed from the aerobic compartment, to the oxygen depleting compartment may be increased or decreased depending upon the amount of recirculation desired, and the amount of forward feed required to fluidize the media. However, it is preferable that the forward feed from the aerobic compartment to the oxygen depleting compartment not be increased to such an extent that dissolved oxygen enters the anoxic compartment. Similarly, it is preferable that the forward feed from the oxygen depleting compartment not be increased to such an extent to allow dissolved oxygen to enter the anoxic compartment. However, in some instances, the addition of some dissolved oxygen may be expected. With a media in the system, a biofilm may grow on outer and ineteral surface of the media. When the biofilm has grown to a particular thickness, for example, 50 microns, an inner layer of microorganisms may be exposed to an anoxic environment regardless of whether an outer layer of microorganisms is exposed to aerobic conditions, so that denitrification may occur in the inner layer of the biofilm. Minimal addition of dissolved oxygen is contemplated by this invention as long as the dissolved oxygen does not overwhelm the denitrification process.

Having thus described several aspects of at least one embodiment of this invention, it should be apparent to those skilled in the art that the foregoing is merely illustrative and not limiting, having been presented by way of example only. Numerous modification and other embodiments are within the scope of the invention. In particular, although many embodiments presented herein involve specific combinations of method acts or system elements, it should be understood that those acts and those elements may be combined in other ways to accomplish the same objectives.

Further, acts, elements, and features discusses only in connection with one embodiment are not intended to be excluded from a similar role in other embodiments.

It is to be appreciated that various alterations, modifications, and improvements can readily occur to those skilled in the art ant that such alterations, modifications, and improvements are intended to be part of the disclosure and within the spirit and scope of the invention.

Moreover, it should also be appreciated that the invention is directed to each feature, system, subsystem, or technique described herein and any combination of two or more features, systems, subsystems, and/or method, if such features, systems, subsystems, and techniques are not mutually inconsistent, is considered to be within the scope of the invention as embodied in the claims.

Use of ordinal terms such as "first," "second," "third," and the like in the claims to modify a claim element does not by itself connote any priority, precedence, or order of one claimed element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configuration described herein are exemplary and that actual parameters and/or configurations will depend on the specific application in which the systems and techniques of the invention are used. Those skilled in the art should also recognize or be able to ascertain, using no more than routing experimentation, equivalents to the specific embodiments of the invention. It is therefore to be understood that the embodiments described herein are presented by way of example only and that, within the scope of the appended claims and equivalents thereto; the invention my be practice otherwise than as specifically described.

What is claimed is:

1. A wastewater treatment system comprising:
    an anoxic compartment fluidly connected to an aerobic compartment;
    a source of wastewater fluidly connected to a first inlet of the anoxic compartment;
    a first fluidizable media comprising bacteria positioned in the anoxic compartment;
    a membrane module comprising a filter membrane positioned in the aerobic compartment; and
    an oxygen depleting compartment comprising:
        an outlet directly fluidly connected to a second inlet of the anoxic compartment;
        a first inlet directly fluidly connected to an outlet of the aerobic compartment; and
        a second inlet directly fluidly connected to an outlet of the anoxic compartment.

2. The wastewater treatment system of claim 1, further comprising an equalization tank positioned upstream of the anoxic compartment.

3. The wastewater treatment system of claim 2, further comprising a pretreatment unit positioned upstream of the equalization tank.

4. The wastewater treatment system of claim 3, wherein the pretreatment unit is a trap.

5. The wastewater treatment system of claim 3, wherein the pretreatment unit is a phosphorous removal unit.

6. The wastewater treatment system of claim 1, wherein the membrane module is disposed at an angle in the second treatment zone.

7. The wastewater treatment system of claim 6, wherein the module is disposed horizontally in the second treatment zone.

8. The wastewater treatment system of claim 1, further comprising means for fluidizing the fluidizable media.

9. The wastewater treatment system of claim 8, wherein the means for fluidizing the fluidizable media comprises a manifold positioned in the anoxic compartment below the fluidizable media.

10. The wastewater treatment system of claim 8, further comprising means for maintaining the fluidizable media within the anoxic compartment.

11. The wastewater treatment system of claim 1, wherein the anoxic compartment further comprises a second fluidizable media in a region separate from the first fluidizable media, the second fluidizable media supporting a different organism than the first fluidizable media.

12. The wastewater treatment system of claim 11, wherein the second fluidizable media is different from the first fluidizable media.

13. The wastewater treatment system of claim 1, wherein the bacteria is anoxic bacteria.

14. The wastewater treatment system of claim 13, wherein the bacteria is denitrifying bacteria.

15. The wastewater treatment system of claim 1, further comprising an aeration system in the aerobic compartment.

16. The wastewater treatment system of claim 2, further comprising a level sensor positioned in the aerobic compartment; and a valve positioned in a filtrate exit line of the aerobic compartment, the valve responsive to a signal generated by the level sensor.

* * * * *